United States Patent [19]

Garfinkle

[11] Patent Number: 5,400,402
[45] Date of Patent: Mar. 21, 1995

[54] SYSTEM FOR LIMITING USE OF DOWN-LOADED VIDEO-ON-DEMAND DATA

[76] Inventor: Norton Garfinkle, 2800 S. Ocean Blvd., Boca Raton, Fla. 33432

[21] Appl. No.: 72,927

[22] Filed: Jun. 7, 1993

[51] Int. Cl.⁶ .............................................. H04N 7/167
[52] U.S. Cl. ........................................ 380/20; 380/10; 380/5; 348/7
[58] Field of Search ............... 380/10, 20, 5; 348/7, 348/10, 6

[56] References Cited

U.S. PATENT DOCUMENTS

| | | | |
|---|---|---|---|
| 4,358,672 | 11/1982 | Hyatt et al. | 235/380 |
| 4,506,387 | 3/1985 | Walter | 455/612 |
| 4,593,337 | 6/1986 | Leone et al. | 360/137 |
| 4,890,320 | 12/1989 | Monslow et al. | 380/10 |
| 4,945,563 | 7/1990 | Horton et al. | 380/5 |
| 4,947,429 | 8/1990 | Bestler et al. | 380/20 |
| 5,046,090 | 9/1991 | Walker et al. | 380/5 |
| 5,051,822 | 9/1991 | Rhoades | 358/86 |
| 5,060,079 | 10/1991 | Rufus-Isaacs | 358/349 |
| 5,070,400 | 12/1991 | Liberman | 358/84 |
| 5,081,680 | 1/1992 | Bennett | 380/50 |
| 5,291,554 | 3/1994 | Morales | 380/5 |

*Primary Examiner*—David C. Cain
*Attorney, Agent, or Firm*—Lane, Aitken & McCann

[57] ABSTRACT

A digital data system that includes a control system at a customer site that blocks access to a down-loaded stored program after it has been viewed a predetermined number of times (e.g., once), or after a predetermined interval, or any combination thereof.

3 Claims, 2 Drawing Sheets

SYSTEM FOR LIMITING USE OF DOWN-LOADED VIDEO-ON-DEMAND DATA

BACKGROUND OF THE INVENTION

1. Field of the Invention

This invention relates generally to video-on-demand systems, and more particularly to an improved system for controlling the use of video programs that have been down-loaded from a central station and stored at a customer's site.

2. Description of the Prior Art

There have been a number of proposals for so-called video-on-demand systems. In certain of these proposals, a customer who wants to view a particular video program (e.g., a movie, a video game, or printed text material) will contact a central station and request a program, which will be down-loaded, at high speed, and stored at the customer's site, for later viewing.

U.S. Pat. No. 4,506,387, which is incorporated herein by reference, discloses a programming-on-demand cable system which allows any one of a plurality of individual users to request anyone of a plurality of video programs they wish to view from a library of programs, and permits the requested program to be available for viewing on a conventional television set at the user's location following a request initiated by the user. Each program is preprogrammed in a memory device selectable by a host computer at a central data station in response to an address signal transmitted from the user. The host computer in conjunction with other electronics transmits the video program at a high non-real-time rate over a fiber optic line network to a data receiving station at the user's location. The data receiving station then converts the received optical data back to electrical data and stores it for subsequent real-time transmission to the user's television set. The system permits the user to view any one of a number of programs transmitted on a non-real-time basis, and also allows the user to store tile transmitted program at his data receiving station for an indefinite period of time for viewing at a later date. In this system, however, there is no provision to limit the use a customer may make of a down-loaded program.

U.S. Pat. No. 5,046,090, discloses a video system in which programs are down-loaded and stored. Video programs are rendered unintelligible, e.g. scrambled, by any analog or digital method, and are made intelligible, e.g., descrambled, using random digital codes located in fields. The random digital keys are themselves encrypted, and decrypted by a one or more key obtained from a database located at a remote central facility, along with user-specific information at the time of viewing. Obviously, this system is relatively complex and requires a data link to the remote central facility in order to obtain decryption data.

Similarly, U.S. Pat. No. 5,051,822, discloses a digital, interactive communication system designed to provide a plurality of remote subscribers with any one of a plurality of stored video games or like software packages through the use of a home computing assembly maintained within the subscriber's home and structured to display video as well as generating audio on a standard television receiver and further incorporating the ability to utilize contemporary video gaming control devices for subscriber program interaction. A bi-directional communication link is established over the telephone lines between the home computing assembly and the central remote game storage center wherein the software programs are transmitted as a modulated carrier to the subscriber. Program selection is controlled by a remote game storage center executive software program. Automatic billing is performed by computing equipment maintained in the remote game storage center and transmitted to a headquarters.

Thus, it will be appreciated that the prior art proposals for controlling down-loaded video data are complex and not altogether suitable for widespread commercial use.

SUMMARY OF THE INVENTION

An object of this invention is the provision of a relatively simple, inexpensive system to limit the use of a program stored at a customer site commensurate with a fee or other arrangement with the customer.

Briefly, the nature of this invention is the provision of a control system at the customer site that operates independently of the central station once the program has been down-loaded. In one embodiment, the control system erases or scrambles the stored program after it has been viewed a predetermined number of times (e.g., once), and in another embodiment the program is erased or scrambled after a predetermined interval (e.g., 24 hours). In one embodiment the stored program is erased after a predetermined interval or after a predetermined number of accesses or any combination thereof based on fixed criteria stored at the customer site. In another embodiment, the down-loaded data includes instructions that specify and controls the number of times the stored data may be accessed, or the period during which the stored material may be accessed, or any combination thereof. In each embodiment, a control system at the customer's site limits further access to the stored program after the limit has been reached.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
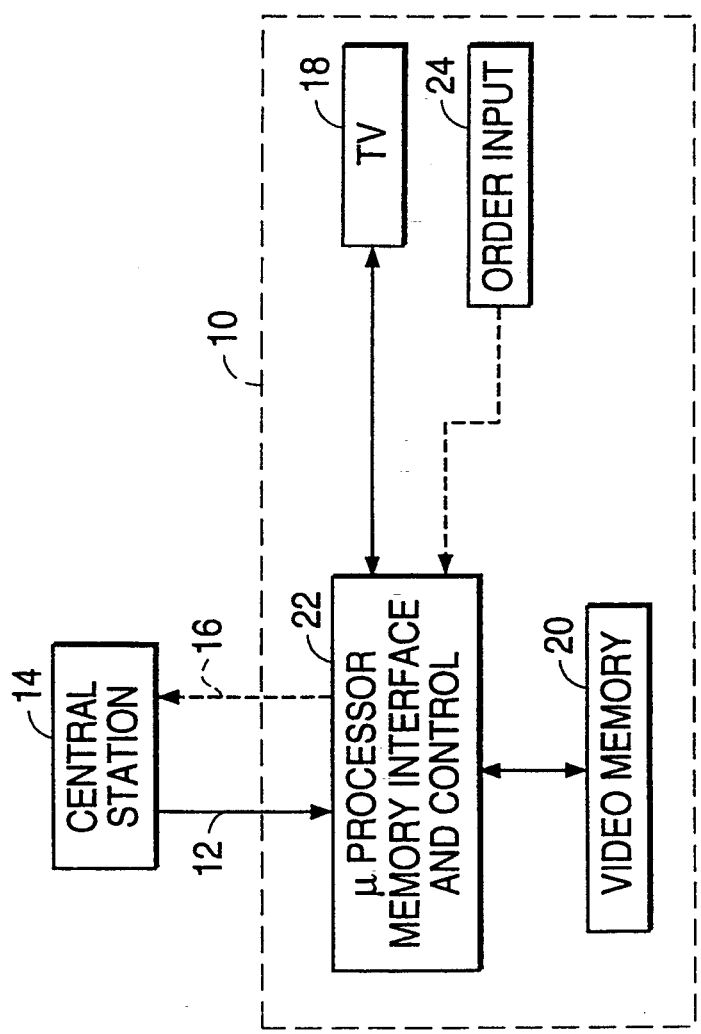
FIG. 1 is a block diagram of a video-on-demand system.

Referring now to FIG. 1 of the drawings, it illustrates a typical video-on-demand system with which the use control system of this invention is applicable. A customer site, indicated within the dashed block 10, is connected by a high-speed data link 12 to a remote central station 14. The high-speed data link may, for example, be a fiber optic, publically switched, telephone link, a satellite wireless link or a cable television link. Typically, the video data will be stored in digital form at the central station and at the customer site. Depending on the nature of link 12, data may be transmitted digitally on link 12 or in an analogue format using digital to analogue and analogue to digital converters. The link 12 serves to down-load, at high speed, a video program to a specific customer address from which an order has been placed from a remote customer site 10. A customer order, depending on the link 12, can be placed over link 12 from the remote site 10 via an order entry unit 24 through which an order may be placed using a keyed-in code. The advantage of such an order entry unit 24 is that it presents a standard order format to the central station 14. A separate link, here indicated by the dashed line 16, could also be used to place an order; the link 16 may be, for example, a standard, public voice telephone connection, in which case the order unit 24 would be a standard audio telephone set.

The remote customer site components include a television set 18 and a digital video memory 20 such as a hard disk memory, a FLASH memory, a tape memory, optical disk memory or other suitable memory for storing the down-load video data. A microprocessor-based memory interface and memory control unit 22 provides an interface between the link 12 and the memory 20. It loads the data into assigned memory address locations. It retrieves the stored digital video data, and converts it to an analogue signal for display on the television 18. Control unit 22 also erases or otherwise (e.g., scrambles) limits access to the stored data after a use limit specified by the central station or fixed at the customer site have been met or exceeded, as will be described in greater detail in connection with FIGS. 2 and 3.

Figure 2:
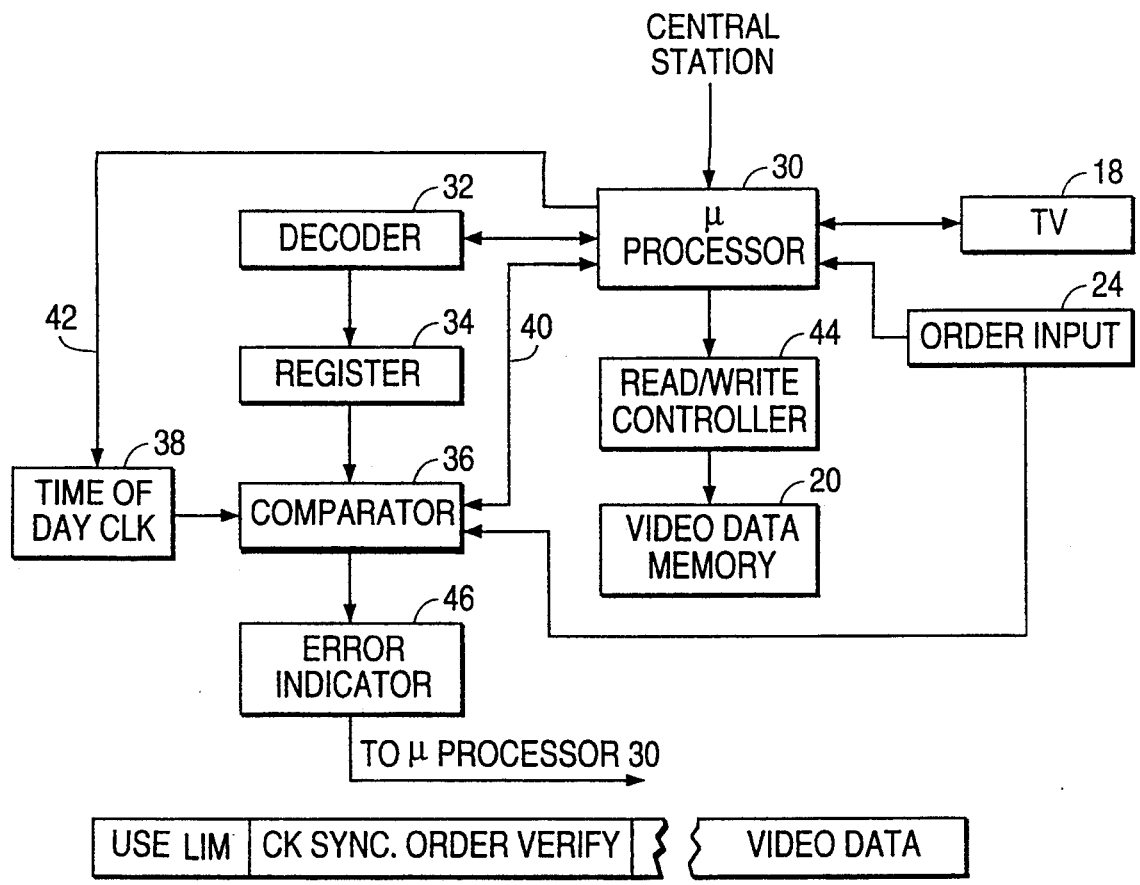
FIG. 2 is a block diagram of one embodiment of a system to limit access to stored programs in accordance with the invention.

Referring now to FIG. 2, in one embodiment of the invention the system limits the user to a prescribed time period (e.g., 24 hours) within which the user can view the stored program. During this period the user can access the stored program as many times as desired. In another embodiment of the invention, the system limits the user to a prescribed number of times that he is allowed to view the stored program. The time limit, or the prescribed number of times, can be encoded at the central station in instructions that accompany the down-loaded data. In this case, the period or the number of views may be specified when the customer orders the program. In one embodiment the period or number of views is fixed by the central station; in another embodiment the period or number of views may be specified by the customer when he orders the program.

It will be appreciated that, if desired, the limits may be combined; for example, the program may be viewed twice in a 12-hour period. Alternatively, the stored program can be erased after a predetermined interval (e.g., 24 hours) or fixed predetermined number of accesses (e.g., one) which is fixed by data permanently stored at the customer site or specified by instructions included with the downloaded data.

The embodiment of the invention shown in FIG. 2 is capable of operating in a time limit mode or access limit mode or a combination of both modes. If only a single limiting mode of operation is needed, the un-needed functionality described herein can be omitted from the system. As shown in FIG. 2, a down-loaded high-speed data stream from the central station is coupled to a suitable microprocessor 30. An output from the microprocessor 30 is coupled to decoder 32 that, in this embodiment, decodes the instructions specifying the use limitations in the down-loaded data. As will be appreciated by those skilled in the art, the function of decoding may be performed as a hardware operation as shown here, or as a programmed operation of the microprocessor 30. It will also be appreciated that limiting data may be permanently stored at the customer site, in which the down-loaded data need not include such user limitation data. The decoded limiting data is stored in a register 34; in this embodiment of the invention it is assumed that both a time limit and a numerical access limit are coded in the instructions and stored in the register 34. However, it is contemplated that, in most applications of the invention, a time limit alone will be used. The output of the register 34 is coupled to an input of a comparator 36, whose other inputs include the output of a time-of-day clock generator 38, and count of the number of times video data at a certain address location has been accessed from microprocessor 30 over line 40. In a particular embodiment of the invention, the down-loaded information from the central station includes time-of-day synchronizing data, which is used (as indicated by the connection 42) to ensure synchronization between the local time-of-day clock and the central station clock. Further, with a coded order input unit 24, the order data may be also inputted to the comparator 36 and compared to order data also encoded in the down-loaded data from the central station. If there is an error between the order data inputted from order unit 24 and the down-loaded order data, an error detector 46 can provide an input to microprocessor 30 to display an error message on television screen 18 and, if desired, block the storage of the video data.

Access to the video data storage memory 20 from the television set 18 is via the microprocessor 30 and a memory read/write control unit 44. Commands from the microprocessor 30 cause the controller 44 to store, retrieve and erase video data in memory 20.

Figure 3:
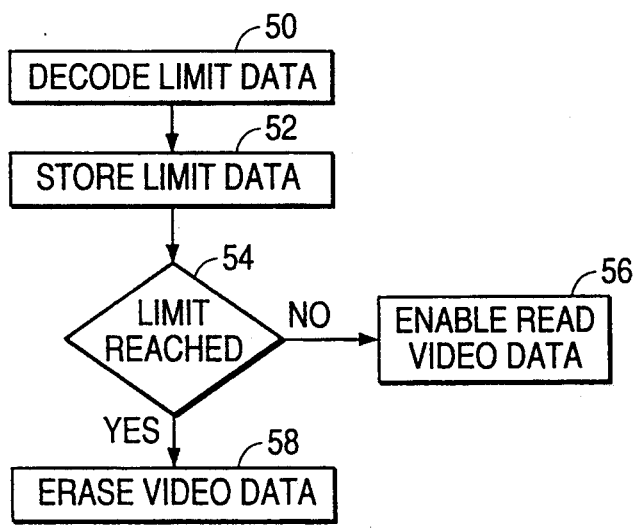
FIG. 3 is a flow diagram of the process steps of the embodiment of FIG. 2.

Referring now to FIG. 3 in addition to FIG. 2, in operation, the limit data is decoded from the down-loaded data stream, as indicated at block 50. This limit data may comprise a time limit or limit the number of accesses to the data, or both. The limit data is stored at block 52 in register 34 and a comparison is made at decision block 54 to determine if the limit has been reached. In the case of a time limit, this comparison can be made with the time-of-day clock 38 and with a limit on the number of accesses, the comparison can be made with access data from microprocessor 30. If the result of the comparison step at block 54 is negative, the microprocessor 30 processes access requests from the television set 18 to the video data stored in memory 20 as indicated at block 56. If the result of the comparison step at block 54 is affirmative, the microprocessor 30 issues a command to controller 44 to erase the video data stored in memory 20 or to otherwise block access to the data by the television set 18.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for providing a video product from a central station to a user site, comprising the steps of:
   transmitting from said central station to said user site a digital data stream comprising said video product, and data establishing a limit for authorized viewing of said video product;
   storing said video product at said user site;
   decoding said data establishing a limit for authorized viewing of said video product;
   storing a result of said decoding step;
   blocking access to said video product stored at said user site if said limit for authorized viewing is exceeded.

2. A method for providing a video product from a central station to a user site, comprising the steps of:

transmitting from said central station to said user site a digital data stream comprising said video product, data establishing a time period during which viewing of said video product is authorized;

storing said video product at said user site;

decoding said data establishing a time period during which viewing of said video product is authorized;

storing a result of said decoding step;

comparing an output of a local clock signal generator with said result of said decoding step; p1 erasing said video product stored at said user site if the result of said comparing step is that the time period during which viewing of said video product is authorized has expired.

3. A method for providing a video product from a central station to a user site, comprising the steps of:

transmitting from said central station to said user site a digital data stream comprising said video product, data establishing a time period during which viewing of said video product is authorized, and time of day clock synchronizing data;

storing said video product at said user site;

decoding said data establishing a time period during which viewing of said video product is authorized;

storing a result of said decoding step;

comparing an output of said local clock time of day signal generator with said result of said decoding step;

erasing said video product stored at said user site if the result of said comparing step is that the time period during which viewing of said video product is authorized has expired.

* * * * *